(12) United States Patent
Kim et al.

(10) Patent No.: US 11,359,101 B2
(45) Date of Patent: Jun. 14, 2022

(54) MATTE GOLF BALL

(71) Applicant: QINGDAO SM PARKER GOLF CO., LTD, Shandong (CN)

(72) Inventors: Ki Jung Kim, Busan (KR); Deuk Ho Song, Geoje-si (KR)

(73) Assignee: QINGDAO SM PARKER GOLF CO., LTD, Qingdao (CN)

( * ) Notice: Subject to any disclaimer, the term of this patent is extended or adjusted under 35 U.S.C. 154(b) by 0 days.

(21) Appl. No.: 17/303,950

(22) Filed: Jun. 10, 2021

(65) Prior Publication Data

US 2021/0292575 A1    Sep. 23, 2021

Related U.S. Application Data

(62) Division of application No. 16/648,322, filed as application No. PCT/KR2017/010456 on Sep. 22, 2017, now Pat. No. 11,180,667.

(51) Int. Cl.

| A63B 37/06 | (2006.01) |
|---|---|
| C09D 7/63 | (2018.01) |
| C09D 7/48 | (2018.01) |
| A63B 37/00 | (2006.01) |
| C09D 167/08 | (2006.01) |

(52) U.S. Cl.
CPC ............ *C09D 7/63* (2018.01); *A63B 37/0024* (2013.01); *A63B 37/0033* (2013.01); *A63B 37/0045* (2013.01); *A63B 37/00221* (2020.08); *C09D 7/48* (2018.01); *C09D 167/08* (2013.01)

(58) Field of Classification Search
CPC .................. A63B 37/0023; A63B 37/0022
USPC ......................................................... 473/378
See application file for complete search history.

(56) References Cited

U.S. PATENT DOCUMENTS

| 2003/0088048 A1 | 5/2003 | Wu |
|---|---|---|
| 2011/0224024 A1 | 9/2011 | Tutmark |
| 2013/0095954 A1 | 4/2013 | Tachibana |
| 2013/0287959 A1 | 10/2013 | Fish |
| 2020/0216686 A1 | 7/2020 | Kim et al. |

FOREIGN PATENT DOCUMENTS

| CN | 104169324 A | 11/2014 |
|---|---|---|
| JP | 2002-080769 | 3/2002 |
| JP | 2010-268857 A | 12/2010 |
| JP | 2015-195879 A | 11/2015 |
| KR | 10-2013-0013232 A | 7/2011 |
| KR | 10-2013-0029383 | 3/2013 |
| KR | 10-1748837 B1 | 1/2017 |
| KR | 10-1748837 B1 | 6/2017 |
| KR | 10-1794526 B1 | 11/2017 |

OTHER PUBLICATIONS

International Search Report dated Jun. 11, 2018, from PCT/KR2017/010456.

*Primary Examiner* — Raeann Gorden
(74) *Attorney, Agent, or Firm* — Adsero IP (57) ABSTRACT

Disclosed is a matte golf ball paint composition that provides a solution to the problem with a golf ball having a difficulty of taking on the original color of the cover due to scattering of the color incurred during the injection molding of the ball, thus helping deliver the original color of the cover; a matte golf ball that not only takes on the original color of the cover but also provides a combination of improved driving distance, spin, and control; and a method for manufacturing a matte golf ball with excellent weather resistance, water resistance, yellowing resistance, and abrasion resistance.

10 Claims, 4 Drawing Sheets

MATTE GOLF BALL

RELATED APPLICATIONS

This application is a divisional of U.S. patent application Ser. No. 16/648,322, filed Mar. 18, 2020, which is a § 371 national phase application of PCT/KR2017/010456 (WO 2019/059433), filed on Sep. 22, 2017, entitled "Matte Golf Ball Coating Paint Composition, Matte Golf Ball, and Manufacturing Method", each of which is incorporated herein by reference in its entirety.

TECHNICAL FIELD

The present invention relates to a matte golf ball paint composition, a matte golf ball, and a manufacturing method thereof, and more particularly to a matte golf ball paint composition that provides a solution to the problem with a golf ball having a difficulty of taking on the original color of the cover due to scattering of the color with the reflection of light caused by the glossy color on the surface of cavity dimples acquired after the injection molding of the ball, thus helping deliver the original color of the cover; a matte golf ball that not only takes on the original color of the cover but also provides a combination of improved driving distance, spin, and control; and a method for manufacturing a matte golf ball with excellent weather resistance, water resistance, yellowing resistance, and abrasion resistance.

BACKGROUND ART

With a variety of factors such as ball material and dimple design having an effect on a golf ball's driving distance, spin, etc., different golf balls are available in a range of material and dimple design options.

The base material for golf balls is largely plastic or rubber materials. The golf ball consists of a core made from a compound of synthetic rubber and chemical substances and formed to surround the center of the ball; an inner layer (hereinafter, referred to as "intermediate layer") using an ionomer and chemical substances; and an outer layer (hereinafter, referred to as "cover") using Lavalon® elastomer, surlyn, urethane, or the like. The material of the cover is the determinant of a golf ball's driving distance, spin rate, etc.

A typical example of the cover is made from either a material called surlyn in at least 80% of all the two-piece golf ball productions or urethane in the remaining 20% of the productions. Surlyn covers are extremely durable but provide hard feel. Urethane covers are softer to deliver high spin rate and provide high backspin and low trajectory needed on wedge shots that require a high level of ball control.

As the color of a golf ball is usually white, it is difficult, to find a place where the golf ball has fallen away from its trajectory in case of bad weather conditions such as rain, cloud, mist, and so forth. This is where colored golf balls are being devised not only as a solution to the above problem but also as a response to the demands for more fashionable appearance or higher visibility.

Korean Patent Laid-open Publication No. 2013-0029383, for example, discloses a polyester resin that is prepared from the free radical polymerization of an unsaturated polyester prepolymer, which polyester resin may include a tint or a colorant when applied as a coating.

In particular, surlyn golf balls are highly compatible with color paints in a relative manner. In the manufacture of surlyn golf balls, the base material is mixed proportionally with a pigment having its own color to form a dispersion containing the pigment, which imparts color to the golf balls through injection molding. Adversely, urethane golf balls are relatively incompatible with color paints and poor in adhesion and abrasion resistance.

Moreover, the original, color of the cover in the urethane or surlyn golf ball is difficult to deliver on the golf ball due to the color scattering incurred during the injection molding of the golf ball.

DISCLOSURE OF INVENTION

Technical Problem

It is therefore an object of the present invention to provide a matte golf ball paint composition that provides a solution to the problem with a golf ball having a difficulty of taking on the original color of the cover due to color scattering incurred during the injection molding of the ball, thus helping deliver the original color of the cover; a matte golf ball that not only takes on the original color of the cover but also provides a combination of improved driving distance, spin, and control; and a method for manufacturing a matte golf ball with excellent weather resistance, water resistance, yellowing resistance, and abrasion resistance.

Technical Solution

To achieve the object of the present invention, there is provided a matte golf ball paint composition, specifically a paint composition for matte golf ball that includes an urethane-modified alkyd resin as a base resin, a curing agent, a light stabilizer, and a silicon-based matting agent. The curing agent is a compound represented by the following chemical formula 1:

[Chemical Formula 1]

where $R_1$, $R_2$, $R_3$, and $R_4$ are independently $C_1$-$C_{30}$ linear or branched alkyl.

The light stabilizer includes a $C_1$-$C_{30}$ alkylene bridge having an ester bond on both terminals and a nitrogen-containing $C_4$-$C_{30}$ heterocyclic compound linked to the terminal of the ester bond.

According to the present invention, there is also provided a method for manufacturing a matte golf ball, specifically a manufacturing method for matte golf ball that includes: pretreating a golf ball; preparing a matte paint; forming a logo or a mark on the pretreated golf ball; applying a top coating of the matte paint; and curing the top-coated golf ball.

The matte paint includes the above-stated paint composition for matte golf ball as a base material.

According to the present invention, there is also provided a matte golf ball, specifically a matte golf ball that includes a core forming an outer layer on an intermediate layer having a single, double or triple layered structure surrounding a center; a cover laminated to surround the core; and a cover layer being provided to surround the cover and containing a cured material. The curable composition includes an urethane-modified alkyd resin in combination with a curing agent, a light stabilizer, and a silicon-based matting agent. The curing agent is a compound represented by the following chemical formula 1:

[Chemical Formula 1]

where $R_1$, $R_2$, $R_3$, and $R_4$ are independently $C_1$-$C_{30}$ linear or branched alkyl.

The light stabilizer includes a $C_1$-$C_{30}$ alkylene bridge having an ester bond on both terminals thereof and a nitrogen-containing $C_4$-$C_{30}$ heterocyclic compound linked to the terminal of the ester bond.

Effects of Invention

The matte golf ball according to the present invention provides a solution to the problem with a golf ball having a difficulty of taking on the original color of the cover due to color scattering incurred during the injection molding of the ball, delivers the original color of the cover, and offers a combination of improved driving distance, spin and control.

In particular, the manufacturing process of the present invention allows the production of matte golf balls with excellent weather resistance, water resistance, yellowing resistance, and abrasion resistance.

Further, the matte golf ball paint composition of the present invention is advantageously applicable to a variety of gold balls, including the traditional golf balls with an urethane/surlyn cover material, neon golf balls using fluorescent colors such as fluorescent dyes, fluorescent pigments, etc.

BEST MODES FOR CARRYING OUT THE INVENTION

Hereinafter, a detailed description will be given as to the present invention.

The present invention is directed to a matte golf ball paint composition, specifically a paint composition for matte golf ball that includes an urethane-modified alkyd resin as a base resin, a curing agent, a light stabilizer, and a silicon-based matting agent. The curing agent may be a compound represented by the following chemical formula 1:

[Chemical Formula 1]

In the formula, $R_1$, $R_2$, $R_3$, and $R_4$ are independently $C_1$-$C_{30}$ linear or branched alkyl.

The light stabilizer may include a $C_1$-$C_{30}$ alkylene bridge having an ester bond on both terminals thereof and a nitrogen-containing $C_4$-$C_{30}$ heterocyclic compound linked to the terminal of the ester bond.

The base resin may be an urethane-modified alkyd resin available for coating compositions, such as a resin, for example, prepared from the condensation reaction between a linoleic-derived oil and a compound having urethane functional groups.

The urethane-modified alkyd resin may have a weight/number average molecular weight of, for example, 8,000 to 12,000 g/mol; 8,000 to 10,000 g/mol; 10,000 to 12,000 g/mol; or 9,000 to 11,000 g/mol. The weight/number average molecular weight in the defined range secures the beneficial effects to enhance the abrasion resistance and the interlayer adhesion to the elastic material.

In this disclosure, the weight/number average molecular weight may be measured using the gel-permeation chromatography.

The urethane-modified alkyd resin may have a hydroxyl (OH) value of, for example, 150 to 180; 170 to 200; 130 to 160; or 130 to 200. The hydroxyl (OH) value in the defined range secures the beneficial effects to enhance the abrasion resistance and the interlayer adhesion to the elastic materials.

In this disclosure, the hydroxyl (OH) value may be determined by a general hydroxyl value measurement method.

The curing agent may include any curing agent available in the coating compositions. Yet, a preferable one is a compound represented by the chemical formula 1, where $R_1$ and $R_3$ are independently $C_6$-$C_{30}$ linear or branched alkyl; and $R_2$ and $R_4$ are independently $C_1$-$C_5$ linear or branched alkyl.

A specific example of the curing agent may be a compound represented by the following chemical formula 2:

[Chemical Formula 2]

The light stabilizer may include any light stabilizer available in the coating compositions. More specifically, the light stabilizer may be a piperidinyl ester-based compound represented by the following chemical formula 3:

[Chemical Formula 3]

In the formula, $R_5$, $R_6$, $R_8$, $R_9$, $R_{11}$, $R_{12}$, $R_{14}$, and $R_{15}$ are independently $C_1$-$C_{30}$ linear or branched alkyl; $R_7$ and $R_{13}$ are independently hydrogen (H) or $C_1$-$C_{30}$ linear or branched alkyl; and $R_{10}$ is $C_1$-$C_{30}$ linear or branched alkylene.

Another example of the light stabilizer may be a compound represented by the chemical formula 3, where $R_5$, $R_6$, $R_8$, $R_9$, $R_{11}$, $R_{12}$, $R_{14}$, and $R_{15}$ are independently $C_1$-$C_5$ linear or branched alkyl; $R_7$ and $R_{13}$ are independently hydrogen (H); and $R_{10}$ is $C_6$-$C_{30}$ linear or branched alkylene.

More specifically, the light stabilizer may be a compound represented by the following chemical formula 4:

[Chemical Formula 4]

The silicon-based matting agent may include any matting agent available in the coating compositions. Yet, a preferable one is an amorphous compound having an $SiO_2$ monomer.

The silicon-based matting agent may be used in an amount of 3 to 15 parts by weight, 3 to 10 parts by weight, 5 to 15 parts by weight, or 4 to 10 parts by weight, with respect to 100 parts by weight of a photocurable composition that includes an urethane-modified alkyd resin as a base resin, an organic solvent, a curing agent, and a light stabilizer. The content of the silicon-based matting agent in the defined range secures the beneficial effect to effectively provide matting properties.

An example of the photocurable composition may include 10 to 30 wt. % of the urethane-modified alkyd resin as a base resin, 50 to 80 wt. % of the organic solvent, 0.1 to 5 wt. % of the curing agent, and 0.1 to 5 wt. % of the light stabilizer with respect to the total weight of the photocurable composition. The composition in the defined range secures the beneficial effect to appropriately provide water resistance, weather resistance, yellowing resistance, durability, etc. with linoleic-derivative oil and NHCOO— groups stable in the photochemical environments.

Another example of the photocurable composition may include 15 to 30 wt. % of the urethane-modified alkyd resin as a base resin, 60 to 75 wt. % of the organic solvent, 0.1 to 5 wt. % of the curing agent, and 0.1 to 5 wt. % of the light stabilizer with respect to the total weight of the photocurable composition. The composition in the defined range secures the beneficial effect to effectively provide water resistance, weather resistance, yellowing resistance, durability, etc. with linoleic-derivative oil and NHCOO— groups stable in the photochemical environments.

More specifically, the photocurable composition may include 20 to 35 wt. % of the urethane-modified alkyd resin as a base resin, 60 to 75 wt. % of the organic solvent, 0.1 to 2.5 wt. % of the curing agent, and 0.1 to 2.5 wt. % of the light stabilizer with respect to the total weight of the photocurable composition. The composition in the defined range not only secures the beneficial effect to most effectively provide water resistance, weather resistance, yellowing resistance, durability, etc. with linoleic-derivative oil and NHCOO— groups stable in the photochemical environments but also allows dilution appropriate for the preparation of a matte coating composition through spray coating or the like.

The organic solvent may include any solvent available in the paint compositions. Yet, a preferable one is a combination of butyl acetate- and ethyl acetate-based solvents, which are advantageously easy to volatile during the curing process.

The organic solvent may include: preferably 25 to 40 wt. % of n-butyl acetate and 25 to 40 wt. % of an ethyl acetate-based solvent; and more preferably 25 to 35 wt. % of n-butyl acetate and 25 to 35 wt. % of an ethyl acetate-based solvent. The ethyl acetate-based solvent as used herein refers to a solvent consisting of at least 85% ethyl acetate.

In the present invention, a photoinitiator available in the paint compositions may be used alone or in combination as a substitute for the curing agent or the light stabilizer. Examples of the photoinitiator as used herein may include organic peroxides, azo compounds, quinine, nitro compounds, acyl halide, hydrazone, mercapto compounds, pyrylium compounds, imidazole, chlorotriazine, benzoin, benzoin alkyl ether, di-ketone, phenone, etc. Examples of the photoinitiators commercially available may include Daracur™ 1173, Darocur™ 4265, Irgacure™ 651, Irgacure™ 184, Irgacure™ 1800, Irgacure™ 369, Irgacure™ 1700, Irgacure™ 907, and Irgacure™ 819, all available from Ciba Geigy; or UVI-6976™ and UVI-6992, both available from Aceto Corp (Lake Success, N.Y., USA). Phenyl-[p-(2-hydroxytetradecyloxy)phenyl]iodonium hexafluoroantimonate is a photoinitiator available from Gelest (Tullytown, Pa., USA). A phosphine oxide derivative as used herein may include 2,4,6-trimethylbenzoyl diphenyl phosphine oxide available under the brand name of Lucirin™ TPO supplied by BASF (Charlotte, N.C., USA). The photoinitiator may be used in an amount of about 0.1 to 10 parts by weight or about 0.1 to 5 parts by weight with respect to 100 parts by weight of the matte golf ball paint composition.

The photoinitiator as used herein may have UV absorption at wavelength of 50 nm or less. Particularly preferable is a photoinitiator having UV absorption in the wavelength range of 380 to 410 nm. At least one photoinitiator may be used in order to maximize the photocuring effect.

The additives as used herein may include at least one selected from the group consisting of a thermal stabilizer, a UV stabilizer, and an antioxidant. Yet, any type of additive is available in the present invention.

Within the range that meets the objectives of the present invention, the matte golf ball paint composition of the present invention may also include a catalyst, a leveling agent, a slip agent, a fluorescent whitening agent, an antifoaming agent, a plasticizer, etc., which may be used in an amount of 0.1 to 15 parts by weight with respect to 100 parts by weight of the matte golf ball paint composition.

The present invention is also directed to a method for manufacturing a matte golf ball using the matte golf ball paint composition. More specifically, the method may include: (S1) pretreating a golf ball; (S2) preparing a matte paint; (S3) forming a logo or a mark on the pretreated golf ball; (S4) applying a top coating of the matte paint; and (S5) curing the top-coated golf ball.

The golf ball as used herein may include any type of golf ball, such as golf balls with an urethane/surlyn cover material or neon golf balls using fluorescent colorants like fluorescent dyes or pigments.

The step (S1) of pretreating a golf ball includes any treatment process to facilitate the coating process, such as by removing foreign substances to enhance adhesion in the subsequent, coating step. Preferably, a treatment process for the inner side of dimples after polishing may be carried out in the manner of a polishing-and-cleaning process to eliminate the gloss on the surface of the ball and help deliver the original color of the cover material.

More specifically, the pretreatment step (S1) may include a polishing process for the bottom and land portions of the dimples in the cover given a plurality of dimples.

The step (S2) of preparing a matte paint is preparing the aforementioned matte golf ball paint composition. The paint composition is prepared by mixing 100 parts by weight of a photocurable composition and 5 to 10 parts by weight of a matting agent with respect to the total weight of the paint composition, where the photocurable composition includes 10 to 30 wt. % of an urethane-modified alkyd resin, 50 to 80 wt. % of an organic solvent, 0.1 to 5 wt. % of a curing agent, and 0.1 to 5 wt. % of a light stabilizer with respect to the total weight of the photocurable composition.

The golf ball may include a cover prepared from a colored composition, for example, containing 0.1 to 29.1 parts by weight of at least one colorant selected from titanium dioxide, dyes, and pigments in addition to 100 parts by weight of urethane or surlyn.

For example, the colorant may include at least one colorant selected from 0.05 to 1.5 parts by weight of titanium dioxide, 2.5 to 15.5 parts by weight of an orange colorant, 0.1 to 29 parts by weight of a red colorant, 0.01 to 10 parts by weight of a green colorant, 0.01 to 5 parts by weight of a blue colorant, 0.01 to 5 parts by weight of an ultra-blue colorant, and 0.01 to 1.5 parts by weight of a yellow colorant.

In this regard, the colorant can deliver a variety of colors, such as white, white blue, red, pink, orange, green, etc., depending on a combination of color options.

The subsequent step (S3) is forming a logo or a mark on the pretreated golf ball. The step of forming a logo or a mark on the pretreated golf ball may be performed subsequent to the steps of applying a base coating on the pretreated golf ball and then curing the golf ball with the base coating on.

The base coating as used herein may include any base coating paint available in the related art. Under necessary, multiple applications as well as a single application is available for the base coating.

The base coating is applied by all types of application methods available in the related art, which methods may include, but are not limited to, inkjet printing, slit coating, spin coating, spray coating, etc.

The aforementioned pretreatment such as polishing helps form a logo or a mark standing out on the golf ball.

The next step (S4) is applying a top coating of the matte paint onto the ball. The top coating may be applied in multiple times under necessary; yet, no more than a single application of the coating is enough to make a matting effect, because the aforementioned pretreatment such as polishing is completed to remove the gloss on the surface of the cover.

In the step of applying a top coating, the amount of the matte paint used in each application may be, if not specifically limited to, 100 to 300 mg.

The thickness of the top coating may be, for example, 10 to 30 μm, preferably 15 to 30 μm. The thickness of the film less than 10 μm makes the photocuring reaction faster but results in deterioration in the properties of the cover coating; whereas the thickness of the film greater than 30 μm retards the photocuring reaction, holding back the sufficient curing reaction of the cover coating and hence deteriorating the properties of the cover coating.

The last step (S5) is curing the top-coated golf ball. The curing step may be performed by a method that includes, if is not limited to, a thermal curing at 50 to 70° C. for 10 to 20 minutes and then a photo-curing with UV, NIR (near-infrared), etc. in terms of the curing efficiency.

The core, the cover, and the top coating may be formed through application and drying procedures. The application may be performed by a dry or wet application method. The dry application may be conducted, for example, as a heat and/or vapor deposition process under high vacuum. The wet application may involve applying a coating of a corresponding resin or its solution in the nitrogen atmosphere under normal pressure through a variety of coating techniques, such as spin coating, slit coating, spray coating, inkjet printing, gravure printing, comma coating, roll-to-roll coating, etc. After completion of the application, for example, UV radiations may be used to cause a curing reaction.

The present invention is also directed to a matte golf ball manufactured by using the matte golf ball paint composition to form a coating of the matte paint on a golf ball. The matte golf ball includes a core forming an outer layer on an intermediate layer having a single, double or triple layered structure surrounding the center of the ball; a cover laminated to surround the core; and a cover layer being provided to surround the cover and containing a cured material. The cured material includes an urethane-modified alkyd resin in combination with a curing agent, a light stabilizer, and a silicon-based matting agent. The curing agent is a compound represented by the following chemical formula 1:

[Chemical Formula 1]

In the formula $R_1$, $R_2$, $R_3$, and $R_4$ are independently $C_1$-$C_{30}$ linear or branched alkyl.

The light stabilizer includes a $C_1$-$C_{30}$ alkylene bridge having an ester bond on both terminals thereof and a nitrogen-containing $C_4$-$C_{30}$ heterocyclic compound linked to the terminal of the ester bond.

The intermediate layer may be 0.9 to 2.0 mm thick, the core 30 to 40.5 mm thick, the cover 1.0 to 2.4 mm thick.

The cover coating may have a gloss, for example, in the range of 0 to 30, 0 to 10, 0 to 5, or 0 to 2, as measured with 45-degree gloss measurement equipment. In this range of gloss, it is possible to effectively provide yellowing resistance and a desired matting effect.

In this disclosure, 45-degree gloss measurement equipment may be used to measure the gloss at a 45-degree angle with a gloss meter according to the ASTM D528 standards.

The color of the cover coating as measured with a CIElab calorimeter, for example, may satisfy the following mathematical formula 1:

$$50<L^*<90;$$

$$-40<a^*<-35 \text{ or } 50<a^*<75; \text{ and}$$

$$25<b^*<35 \text{ or } 70<b^*<110 \qquad \text{[Mathematical Formula 1]}$$

The core may include any type of core available in the related art. Preferably, the core contains 0.5 to 25 parts by weight of titanium dioxide in addition to 100 parts by weight of a butadiene rubber resin, which composition provides advantages like blocking out UV rays and protecting the core against oxidation.

The core may be transparent, translucent, or opaque.

The intermediate layer may include any type of intermediate layer available in the related art. Preferably, the intermediate layer contains 0.2 to 4.5 parts by weight of titanium dioxide in addition to 100 parts by weight of an ionomer, for example, HPF® available from Dupont, which composition provides advantages like blocking UV radiations and protecting the core against oxidation.

The intermediate layer may be transparent, translucent, or opaque.

The cover may include any type of cover available in the related art. Preferably, the cover is prepared from a colored composition containing 0.1 to 29.1 parts by weight of at least one colorant selected from titanium dioxide, a dye and a pigment in addition to 100 parts by weight of urethane or surlyn, which composition provides advantages like delivering the original color of the cover and blocking out UV rays.

The cover may be transparent, translucent, or opaque.

The colorant may be a combination of at least one colorant selected from 0.05 to 1.5 parts by weight of titanium dioxide, 2.5 to 15.5 parts by weight of an orange colorant, 0.1 to 29 parts by weight of a red colorant, 0.01 to 10 parts by weight of a green colorant, 0.01 to 5 parts by weight of a blue colorant, 0.01 to 5 parts by weight of an ultra-blue colorant, and 0.01 to 1.5 parts by weight of a yellow colorant.

The cover may have a plurality of dimples, with a uniform coating thickness of approximately 10 to 30 μm on the bottom and land portions of each dimple. Preferably, the surface of the core may also contain dimples at positions corresponding to the dimples of the cover.

The thickness of the cover is desirably in the range of, for example, 1.0 to 2.4 mm or 1.2 to 2.2 mm. The thickness below the defined range is inappropriate for creating dimples that are provided to form a constant thickness of the cover; and the thickness above the defined range causes a rise of the process cost and a reduction of permeability, thereby deteriorating the characteristics of the golf ball.

Preferably, as for the chromaticity of the golf ball, the CIElab color difference (ΔE) between the intermediate layer and the cover is 12 or less.

More preferably, as for the chromaticity of the golf ball, the CIElab color difference (ΔE) between the intermediate layer and the cover is 12 or less; and the CIElab color difference (ΔE) between the core and the cover is 12 or less.

Even more preferably, as for the chromaticity of the golf ball, the CIElab color difference (ΔE) between the intermediate layer and the cover is 12 or less; and the CIElab color difference (ΔE) between the intermediate layer and the core is 12 or less.

Most preferably, as for the chromaticity of the golf ball, the CIElab color difference (ΔE) between the intermediate layer and the cover is 12 or less; the CIElab color difference (ΔE) between the intermediate layer and the core is 12 or less; and the CIElab color difference (ΔE) between the core and the cover is 12 or less.

In this disclosure, the CIElab colorimetric measurement method may use a spectrophotometer capable of a color analysis.

As described above, the golf ball of the present invention exhibits excellent properties in regards to weather resistance, water resistance, yellowing resistance, and abrasion resistance as well as high visibility and excellent matting effects by use of a cover coating that helps prevent scattering of the color during the injection molding and secure the original color gloss of the resin.

Hereinafter, a detailed description will be given as to the present invention with reference to the following examples, which are given only to exemplify the present invention and not intended to limit the scope of the present invention.

EXAMPLES

Examples 1 to 4

For a golf ball for use in the examples, a core was manufactured to a size of 30 to 40.50 mm by blending 0.5 to 2.5 parts by weight of titanium dioxide with 100 parts by weight of a butadiene rubber resin and curing the mixture.

The intermediate layer of the golf ball was provided to have a double layered structure 0.9 to 2.0 mm thick from a composition containing 0.2 to 4.5 parts by weight of titanium dioxide with respect to 100 parts by weight of an HPF® material available from Dupont through injection and drying on the center.

The cover of the golf ball was prepared in the form of a transparent layer 1.0 to 2.4 mm thick from a colored composition containing 0.1 to 29.1 parts by weight of at least one colorant selected from titanium dioxide, a dye, and a pigment in addition to 100 parts by weight of urethane or surlyn through coating and drying on the core. The colorant was varied according to the recipes of the following Table 1 to manufacture six golf balls each in a different color.

TABLE 1

| Color | Recipe | | | |
|---|---|---|---|---|
| Pink | Surlyn or urethane 100 parts | TiO₂ 0.34 parts | Orange 4.3 parts | Red 0.9 parts |
| Red | Surlyn or urethane 100 parts | Red 16 parts | Orange 10.1 parts | |
| Orange | Surlyn or urethane 100 parts | Orange 6 parts | Greed 0.88 parts | TiO₂ 0.2 parts |
| Blue | Suryln or urethane 100 parts | Blue 0.1 parts | | |
| Yellow | Surlyn or urethane 100 parts | TiO₂ 0.2 parts | Green 0.01 parts | Yellow 0.56 parts |
| White | Surlyn or urethane 100 parts | TiO₂ 3 parts | Ultra Blue 0.2 parts | |

The cover was given a plurality of dimples, with a uniform coating thickness of approximately 10 to 30 μm on the bottom and land portions of each dimple. The surface of the core was formed to contain dimples at positions corresponding to the dimples of the cover.

S1: Pretreatment of Golf Ball

In the step S1, the bottom and land portions of the dimples on the cover of the given golf ball were subjected to a pretreatment for finishing with a matte surface through the polishing process.

S2: Preparation of Matte Paint

In the step S2, a matte paint was prepared from a mixture of 5 to 10 parts by weight of amorphous silicon oxide as a matting agent with 100 parts by weight of a photocurable composition, which contained 10 to 30 wt. % of an urethane-modified alkyd resin (number average molecular weight: 8,000~12,000 g/mol; OH value: 150~180), 25 to 40 wt. % of n-butyl acetate as a solvent, 25 to 40 wt. % of an ethyl acetate-based solvent (containing 85% ethyl acetate), 0.1 to 5 wt. % of a compound of the chemical formula 2 as a curing agent of the chemical formula 1, and 0.1 to 5 wt. % of a compound of the chemical formula 4 as a light stabilizer of the chemical formula 3 with respect to the total weight of the matte golf ball paint composition.

[Chemical Formula 2]

[Chemical Formula 4]

S3: Forming Logo or Mark on Golf Ball

In the step S3, a base coating was applied to the pretreated golf ball through spray coating, and the golf ball given a the base coating was then cured.

For application of the base coating, a base coating paint containing urethane commonly available was spray-coated on the golf ball and cured in the NIR (near-infrared) or thermal drying conditions.

Subsequently, a logo or a mark was imprinted to stand out on the ball surface.

S4: Top Coating of Matte Paint

In the step S4, a top coating of the matte paint was applied on the ball. The amount of the matte paint in a single application was 100 to 300 mg and the thickness of the top coating was maintained in the range of 15 to 30 μm.

S5: Curing of Top-Coated Golf Ball

In the step S5, the top-coated golf ball was subjected to a curing process, which was carried out at 50 to 70° C. for 10 to 20 minutes in the NIR (near-infrared) drying conditions.

[Performance Testing]

The performance testing was conducted in the following procedures.

Gloss

Figure 1:
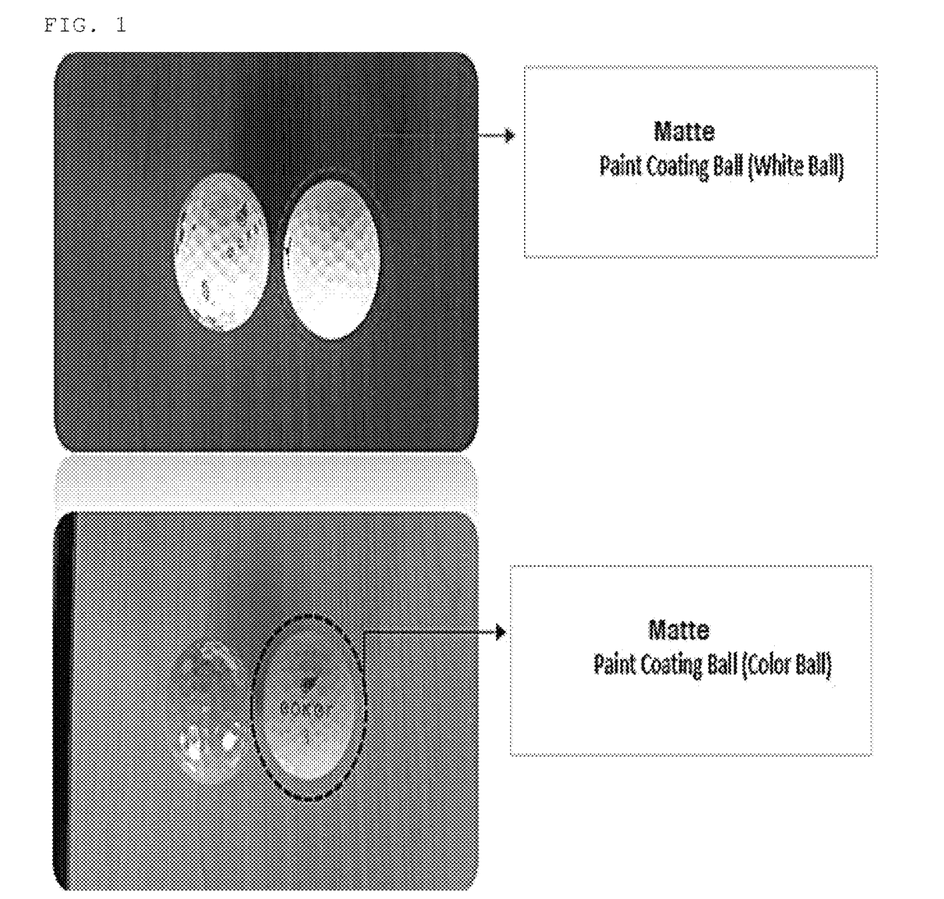
FIG. 1 presents images showing the difference of gloss between a novel matte golf ball and a conventional glossy golf ball; in each image, the right-sided matte golf ball has a noticeably lower reflection of light than the left-sided glossy golf ball.

The reflection difference was measured through visual observations of golf balls under fluorescent light. The comparison is given in FIG. 1, where the reflection of light is noticeably lower in the right-sided matte golf ball than in the left-sided glossy golf ball.

Adhesion

Using a sharp razor blade (Dorco), cross-hatch cuts were made in the logo portion (15~20 mm×15~20 mm) of the golf ball, and the spacing between the cuts was 1 mm. A piece of clear adhesive tape was pressed against the cut area and pulled off three times. The cut area was then inspected for removal of paint and rated on the scale given as: O=no peeling; Δ=1 or 2 incisions peeled; and NG=at least 3 incisions peeled.

Abrasion Resistance

The golf ball was put into an SUS container filled with sanding stone and water and subjected to six-hour rotations. The surface of the golf ball was then inspected for removal of paint through visual observations. The measurement results from four repeated tests were averaged for assessment on a rating scale of 1 to 5: "5 (excellent)"=almost no peeling from the surface; and "1 (poor)"=paint peeling shown.

Field Testing

After consecutive 100 golf shots at a rate of 40 m/sec, the golf hall was inspected for the adhesion of the paint through visual observations three times and rated according to the number of paint peelings on the whole area of the ball on the scale given as: O=no peeling; Δ=1 or 2 peelings; and NG=at least 3 peelings.

The results of the tests carried out in the above-stated procedures were summarised in the following Table 2.

TABLE 2

|  |  | Color | | | | | | | |
|---|---|---|---|---|---|---|---|---|---|
|  |  | Red | Pink | Orange | Yellow | Red | Pink | Orange | Yellow |
|  |  | | | | | Type | | | |
|  |  | Matte | Matte | Matte | Matte | Glossy | Glossy | Glossy | Glossy |
| Adhesion | $1^{st}$ | O | O | O | O | O | O | O | Δ |
|  | $2^{nd}$ | O | O | O | O | Δ | O | O | O |
|  | $3^{rd}$ | O | O | O | O | O | Δ | Δ | O |
| Abrasion test | $1^{st}$ | 4 | 4 | 4.5 | 4 | 4 | 4 | 4 | 4 |
|  | $2^{nd}$ | 4 | 4 | 4.5 | 4.5 | 4 | 4 | 4 | 4 |
|  | $3^{rd}$ | 4 | 4 | 4.5 | 4.5 | 4 | 4 | 4 | 4 |
|  | $4^{th}$ | 4.5 | 4 | 4.5 | 4 | 4 | 4 | 4 | 4 |
|  | Avg. | 4.1 | 4.0 | 4.5 | 4.25 | 4.0 | 4.0 | 4.0 | 4.0 |
| Field test | $1^{st}$ | O | O | O | O | O | O | O | O |
|  | $2^{nd}$ | O | O | O | O | O | O | O | O |
|  | $3^{rd}$ | O | O | O | O | O | O | O | O |

Figure 2:
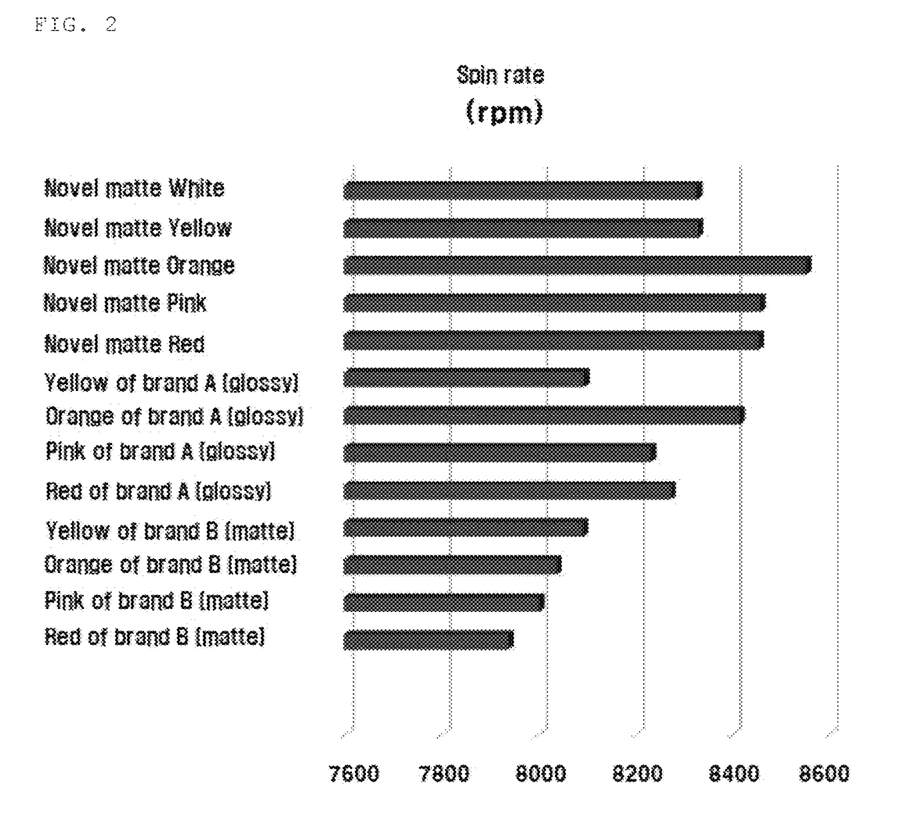
FIG. 2 is a diagram showing the spin rate of the matte golf ball according to the present invention.
Figure 3:
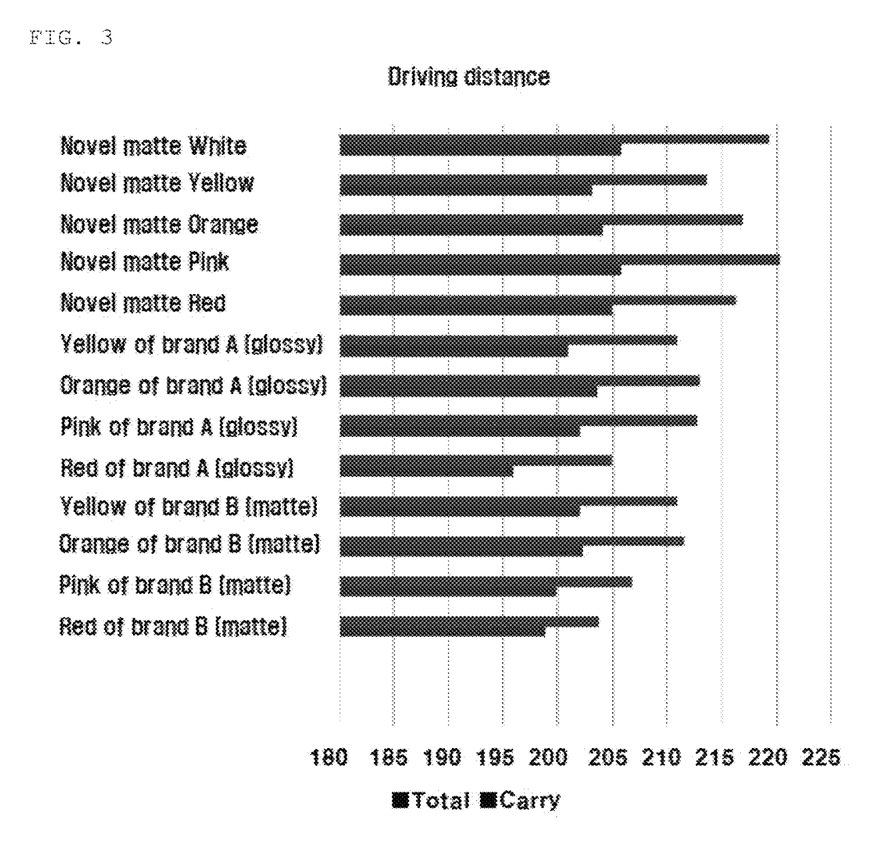
FIG. 3 is a diagram showing the driving distance of the matte golf ball according to the present invention.
Figure 4:
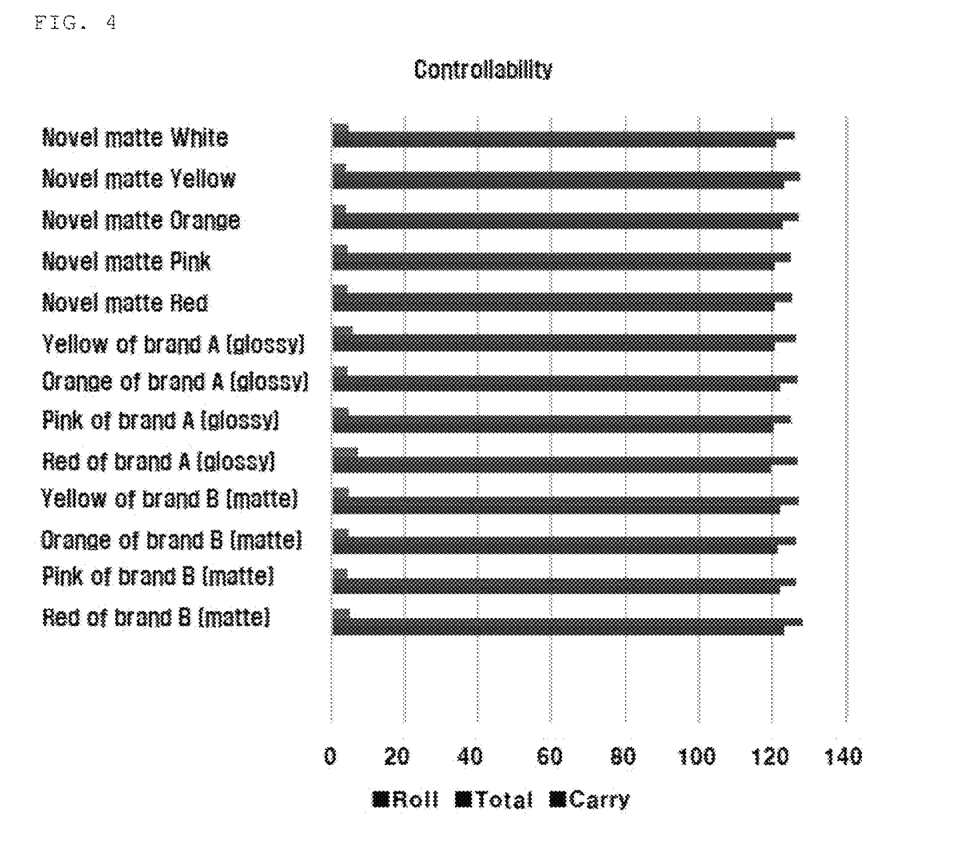
FIG. 4 is a diagram showing the controllability of the matte golf ball according to the present invention.

For reference, the "glossy" golf balls in Table 2 were manufactured using a general glossy paint composition (for example, a paint composition used in the glossy color series available from Nike Inc. and shown in FIGS. 2, 3 and 4) in place of the matte paint composition of the present invention and given as comparative examples.

As can be seen from Table 2, the matte golf balls manufactured using the matte golf ball paint composition of the present invention showed higher performances in all the adhesion, abrasion and field tests than the conventional glossy golf balls or the matte color series products commercially available from Volvik Inc.

For the above-specified matte golf balls, color CIElab tests and HUNTER LAB tests were carried out to determine chromaticity and yellowness indices. The measurement results were summarized in the following Table 3.

TABLE 3

| BALL | AVERAGE CIELAB | | | AVERAGE HUNTER | | | |
|---|---|---|---|---|---|---|---|
| NO. | L* | a* | b* | L | a | b | YI |
| RED | 55.17 | 71.7 | 34.79 | 48.06 | 73.84 | 21.27 | 189.08 |
| ORANGE | 73.27 | 52.23 | 72.02 | 67.51 | 54.95 | 40.14 | 164.56 |
| YELLOW | 88.85 | −38.49 | 90 | 85.93 | −35.23 | 52.53 | 80.02 |
| PINK | 61.91 | 67.26 | 27.16 | 55.04 | 70.26 | 18.96 | 152.97 |
| VOLVIK RED | 50.16 | 73.44 | 41.76 | 43.08 | 74.53 | 22.47 | 217.09 |
| VOLVIK ORANGE | 78.58 | 54.84 | 89.86 | 73.62 | 59.32 | 46.87 | 171.51 |
| VOLVIK YELLOW | 91.24 | −43.88 | 104.87 | 88.89 | −40.22 | 57.18 | 82.68 |
| VOLVIK PINK | 70.58 | 83.8 | 23.58 | 64.48 | 93.82 | 18.18 | 154.58 |

As can be seen from Table 3, the results showed that the chromaticity and yellowness indices were all improved.

Further, the matte golf balls of the present invention and the commercial golf ball products were measured in regards to the driving distance. The measurement results were presented in FIG. 2. The commercial golf ball products were glossy color series products available from Nike Inc. (referred to as "brand A") and matte color series products from Volvik Inc. (referred to as "brand B"). As can be seen from FIG. 2, the golf balls of the present invention displayed improved properties in terms of the spin rate in relation to the commercial products.

Furthermore, the matte golf balls of the present invention and the commercial golf ball products were measured in regards to the spin rate. The measurement results were presented in FIG. 3. The commercial golf ball products were glossy color series products available from Nike Inc. (referred to as "brand A") and matte color series products from Volvik Inc. (referred to as "brand B"). As can be seen from FIG. 3, the golf balls of the present invention displayed improved properties in terms of the driving distance in relation to the commercial products.

Moreover, the matte golf balls of the present invention and the commercial golf ball, products were measured in regards to the controllability. The measurement results were presented in FIG. 4. The commercial golf ball products were glossy color series products available from Nike Inc. (referred to as "brand A") and matte color series products from Volvik Inc. (referred to as "brand B"). As can be seen from FIG. 4, the golf balls of the present invention were almost equivalent in the controllability to the commercial products.

What is claimed is:

1. A matte golf ball comprising:
a core forming an outer layer on an intermediate layer having a single, double or triple layered structure surrounding a center;
a cover laminated to surround the core; and
a cover layer being provided to surround the cover and containing a cured material,
the cured material comprising an urethane-modified alkyd resin in combination with a curing agent, a light stabilizer, and a silicon-based matting agent,
the curing agent being a compound represented by the following chemical formula 1:

[Chemical Formula 1]

wherein $R_1$, $R_2$, $R_3$, and $R_4$ are independently $C_1$-$C_{30}$ linear or branched alkyl,
the light stabilizer comprising a $C_1$-$C_{30}$ alkylene bridge having an ester bond on both terminals thereof and a nitrogen-containing $C_4$-$C_{30}$ heterocyclic compound linked to the terminal of the ester bond.

2. The matte golf ball as claimed in claim 1, wherein the intermediate layer is 0.9 to 2.0 mm thick, the core 30 to 40.50 mm thick, the cover 1.0 to 2.4 mm thick.

3. The matte golf ball as claimed in claim 1, wherein the cover has a plurality of dimples with a coating thickness of 10 to 30 μm on bottom and land portions of each dimple,
the core containing dimples on the surface thereof at positions corresponding to the dimples of the cover.

4. The matte golf ball as claimed in claim 1, wherein the base resin has a number average molecular weight of 8,000 to 12,000 g/mol and a hydroxyl (OH) value of 150 to 180.

5. The matte golf ball as claimed in claim 1, wherein the curing agent is a compound represented by the chemical formula 1, wherein $R_1$ and $R_3$ are independently $C_6$-$C_{30}$ linear or branched alkyl; and $R_2$ and $R_4$ are independently $C_1$-$C_5$ linear or branched alkyl.

6. The matte golf ball as claimed in claim 1, wherein the light stabilizer is a piperidinyl ester-based compound represented by the following chemical formula 3:

[Chemical Formula 3]

wherein $R_5$, $R_6$, $R_8$, $R_9$, $R_{11}$, $R_{12}$, $R_{14}$, and $R_{15}$ are independently $C_1$-$C_{30}$ linear or branched alkyl; $R_7$ and $R_{13}$ are independently hydrogen (H) or $C_1$-$C_{30}$ linear or branched alkyl; and $R_{10}$ is $C_1$-$C_{30}$ linear or branched alkylene.

7. The matte golf ball as claimed in claim 6, wherein the light stabilizer is a compound represented by the chemical formula 3, wherein $R_5$, $R_6$, $R_8$, $R_9$, $R_{11}$, $R_{12}$, $R_{14}$, and $R_{15}$ are independently $C_1$-$C_5$ linear or branched alkyl; $R_7$ and $R_{13}$ are hydrogen (H); and $R_{10}$ is $C_6$-$C_{30}$ linear or branched alkylene.

8. The matte golf ball as claimed in claim 1, wherein the silicon-based matting agent is an amorphous compound having an $SiO_2$ unit.

9. The matte golf ball as claimed in claim 1, wherein the silicon-based matting agent is used in an amount of 3 to 15 parts by weight with respect to 100 parts by weight of the matte golf ball paint composition comprising an urethane-modified alkyd resin as a base resin, an organic solvent, a curing agent, and a light stabilizer.

10. The matte golf ball as claimed in claim 9, wherein the matte golf ball paint composition comprises 10 to 30 wt. % of the base resin, 50 to 80 wt. % of the organic solvent, 0.1 to 5 wt. % of the curing agent, and 0.1 to 5 wt. % of the light stabilizer with respect to the total weight of the matte golf ball paint composition.

* * * * *